United States Patent
Cheng (10) Patent No.: US 8,768,585 B2
(45) Date of Patent: Jul. 1, 2014

(54) SHIFT CONTROL SYSTEM FOR POWER-ASSISTED BICYCLE

(75) Inventor: Chi-Chang Cheng, Chang Hua Hsien (TW)

(73) Assignee: J.D. Components Co., Ltd., Chang Hua Hsien (TW)

( * ) Notice: Subject to any disclaimer, the term of this patent is extended or adjusted under 35 U.S.C. 154(b) by 153 days.

(21) Appl. No.: 13/445,701

(22) Filed: Apr. 12, 2012

(65) Prior Publication Data

US 2012/0265414 A1    Oct. 18, 2012

(30) Foreign Application Priority Data

Apr. 13, 2011   (TW) .............................. 100112824 A (51) Int. Cl.
   *G06F 7/00*   (2006.01)
(52) U.S. Cl.
   USPC ............................................. 701/55; 280/260
(58) Field of Classification Search
   USPC .................. 701/55; 474/70; 280/260, 236
   See application file for complete search history.

(56) References Cited

U.S. PATENT DOCUMENTS

| 6,774,771 | B2 | 8/2004 | Takeda |
| 7,290,779 | B2 * | 11/2007 | Takamoto et al. ............ 280/260 |

FOREIGN PATENT DOCUMENTS

| JP | 2004243920 A | 9/2009 |
| TW | 583117 B | 4/2004 |

* cited by examiner

*Primary Examiner* — Thomas Black
*Assistant Examiner* — Luke Huynh
(74) *Attorney, Agent, or Firm* — Muncy, Geissler, Olds & Lowe, P.C.

(57) ABSTRACT

A shift control system working with a power-assisted bicycle that has an assisting-power supplying system and a derailleur. The shift control system includes a microcomputer in which plural shifting condition tables are stored. The assisting-power supplying system provides at least two different assisting modes. The shift control system also includes a shifting driver and at least one sensor for sensing at least one of a wheel speed, a crank speed, a pedaling force and a road gradient so as to generate at least one sensing signal and obtain at least one sensing result. The microcomputer selects one of the shifting condition tables in accordance with the current assisting mode for comparing the sensing result, thereby determining whether upshifting or downshifting is to be conducted. Then the microcomputer controls the shifting driver to send a shift control signal to make the derailleur upshift or downshift.

21 Claims, 7 Drawing Sheets

SHIFT CONTROL SYSTEM FOR POWER-ASSISTED BICYCLE

BACKGROUND OF THE INVENTION

1. Technical Field

The present invention relates to bicycles, and more particularly to a shift control system used in a power-assisted bicycle.

2. Description of Related Art

As to the prior art in the field of power-assisted bicycles, Japan Patent Application Publication No. 2004-243920 has disclosed an electrically assisted bicycle, which determines whether to use an assisting power according to a pedaling force and a rotational speed of its driving wheel, so as to allow effort-saving riding experience.

Besides, a known automatic shifting system for bicycles is described in Taiwan Patent No. 583117, titled "AUTOMATIC GEAR-SHIFTING CONTROL DEVICE FOR BICYCLE AND METHOD THEREOF" or its corresponding patent, U.S. Pat. No. 6,774,771. As stated in the background paragraphs of the above-referred patents, an automatic shifting device that conducts appropriate shifting according to the running condition of the bicycle is well known in the art.

The foregoing prior-art devices only involve converting a signal sensed by a sensor into a numeral value and comparing the numeral value to gear position values of various gear positions so as to determine whether shifting is to be conducted. However, the actual riding conditions are changeable, and the shifting operation can become abrupt or bungling when influenced by a number of factors, such as steep slopes and incoherent pedaling movements. Without any solution for such a problem, the prior-art devices tend to be discomfort cyclists with rough shifting. Moreover, when the automatic shift control technology of Taiwan Patent No. 583117 combined with a power-assisted bicycle, the difference between the automatic shifting operation and the cyclists' expectation can be even more significant and discomfort the cyclists more seriously because in addition to the pedaling movements, the assisting power also brings effects to the shifting operation.

SUMMARY OF THE INVENTION

The primary objective of the present invention is to provide a shift control system that is used in a power-assisted bicycle for conducting shifting operation in accordance with various assisting modes of the power-assisted bicycle, while minimizing harshness during the shifting operation.

For achieving the foregoing objective, according to the present invention, a shift control system is configured to work with a power-assisted bicycle that has an assisting-power supplying system and a derailleur, the shift control system comprising: a microcomputer storing therein a plurality of shifting condition tables and being electrically connected to the assisting-power supplying system, so as to control the assisting-power supplying system to provide at least two assisting modes that have different assisting-power output ratios; a shifting driver being electrically connected to the microcomputer and controlled by the microcomputer to conduct automatic shifting; and at least one sensor being deposited at a predetermined location on the power-assisted bicycle and electrically connected to the microcomputer, for sensing at least one of a wheel speed, a crank speed, a pedaling force and a road gradient so as to generate at least one sensing signal that is transmitted to the microcomputer, so that the microcomputer produces at least one sensing result according to the at least one sensing signal, wherein the microcomputer selects one of the shifting condition tables in accordance with the current assisting mode of the assisting-power supplying system for comparing the at least one sensing result, thereby determining whether upshifting or downshifting is to be conducted, and then controls the shifting driver to send a shift control signal to the derailleur for making the derailleur conduct upshifting or downshifting.

Additionally, the present invention also provides a shift control system is configured to work with a power-assisted bicycle that has an assisting-power supplying system and a derailleur, the shift control system comprising: a microcomputer storing therein a plurality of shifting condition tables; a shifting driver being electrically connected to the microcomputer and controlled by the microcomputer to conduct automatic shifting; at least one first sensor being deposited at a predetermined location on the power-assisted bicycle and electrically connected to the microcomputer, for sensing at least one of a wheel speed, a crank speed, a pedaling force and a road gradient so as to generate at least one sensing signal that is transmitted to the microcomputer, so that the microcomputer produces at least one sensing result according to the at least one sensing signal; a second sensor being incorporated in the assisting-power supplying system, for sensing an assisting-power output ratio of the assisting-power supplying system and sending an output-ratio signal accordingly to the microcomputer; the microcomputer identifying a current assisting mode of the assisting-power supplying system according to the output-ratio signal, and selecting one of the shifting condition tables accordingly for comparing the at least one sensing result, thereby determining whether upshifting or downshifting is to be conducted, and then controls the shifting driver to send a shift control signal to the derailleur for making the derailleur conduct upshifting or downshifting.

Thereby, the shift control system of the present invention is able to conduct appropriate shifting according to the assisting modes of the bicycle, thereby reducing discomfort experienced during riding.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
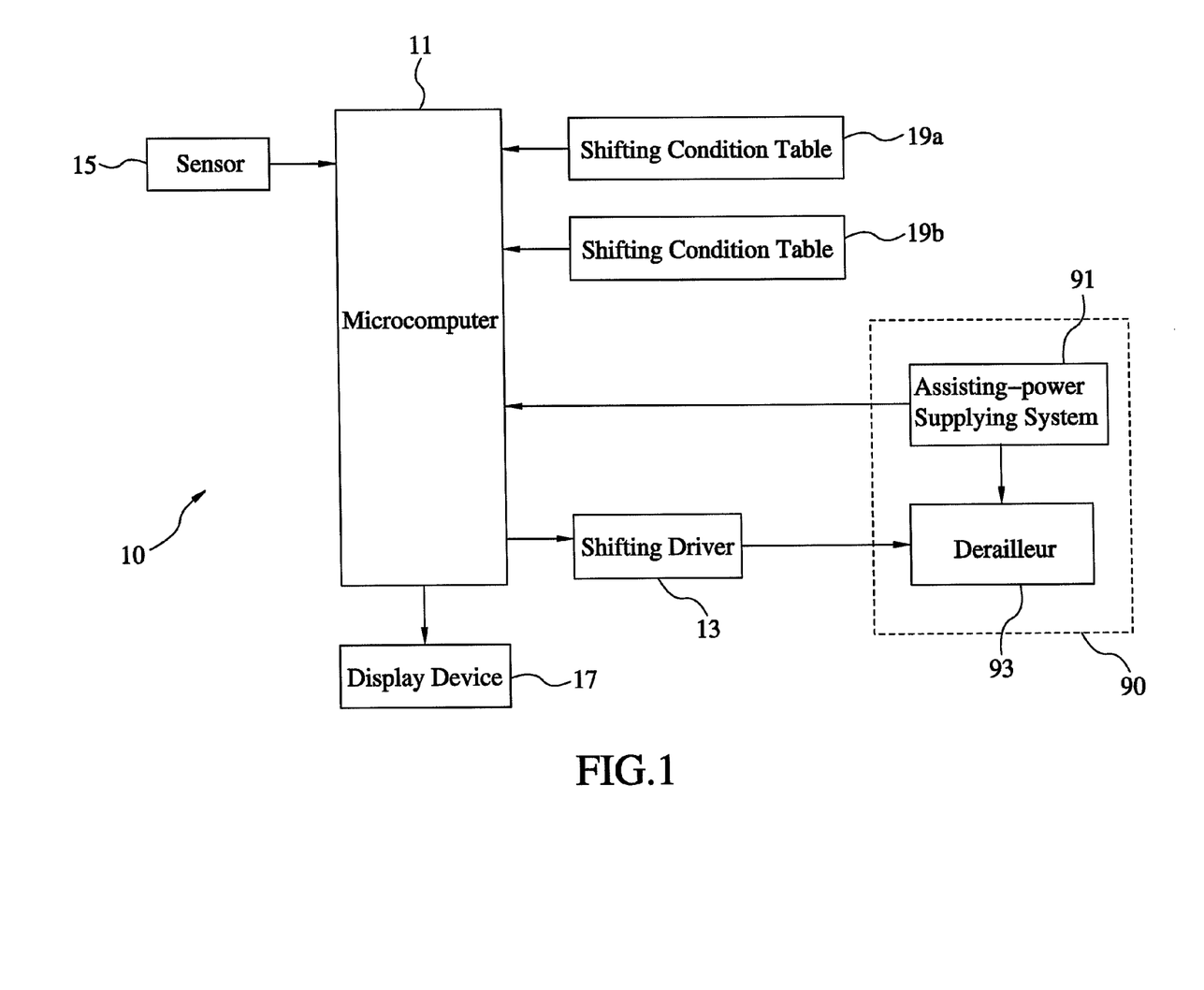
FIG. 1 is a structural block diagram of a first preferred embodiment of the present invention.
Figure 2:
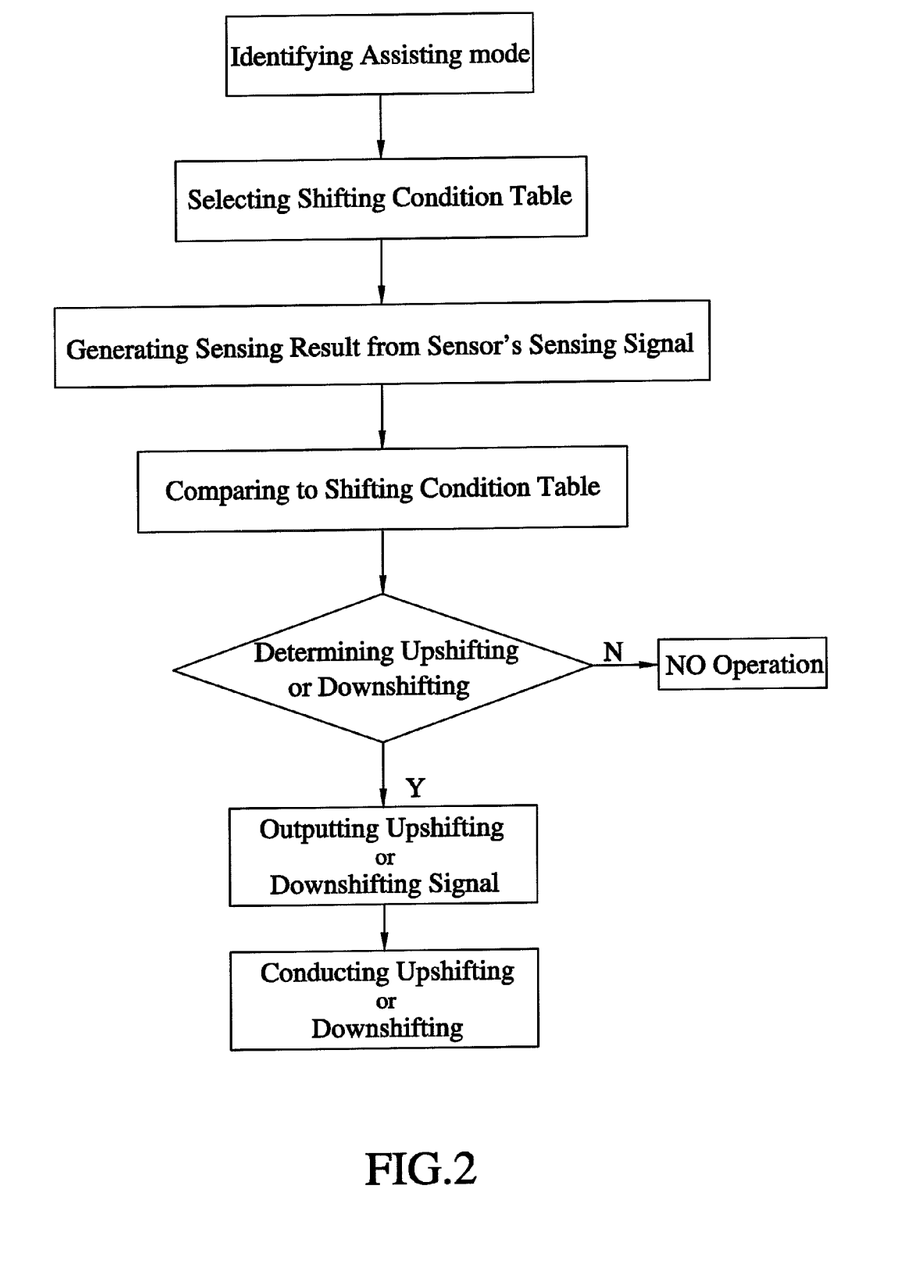
FIG. 2 is a flowchart of the first preferred embodiment of the present invention.
Figure 3:
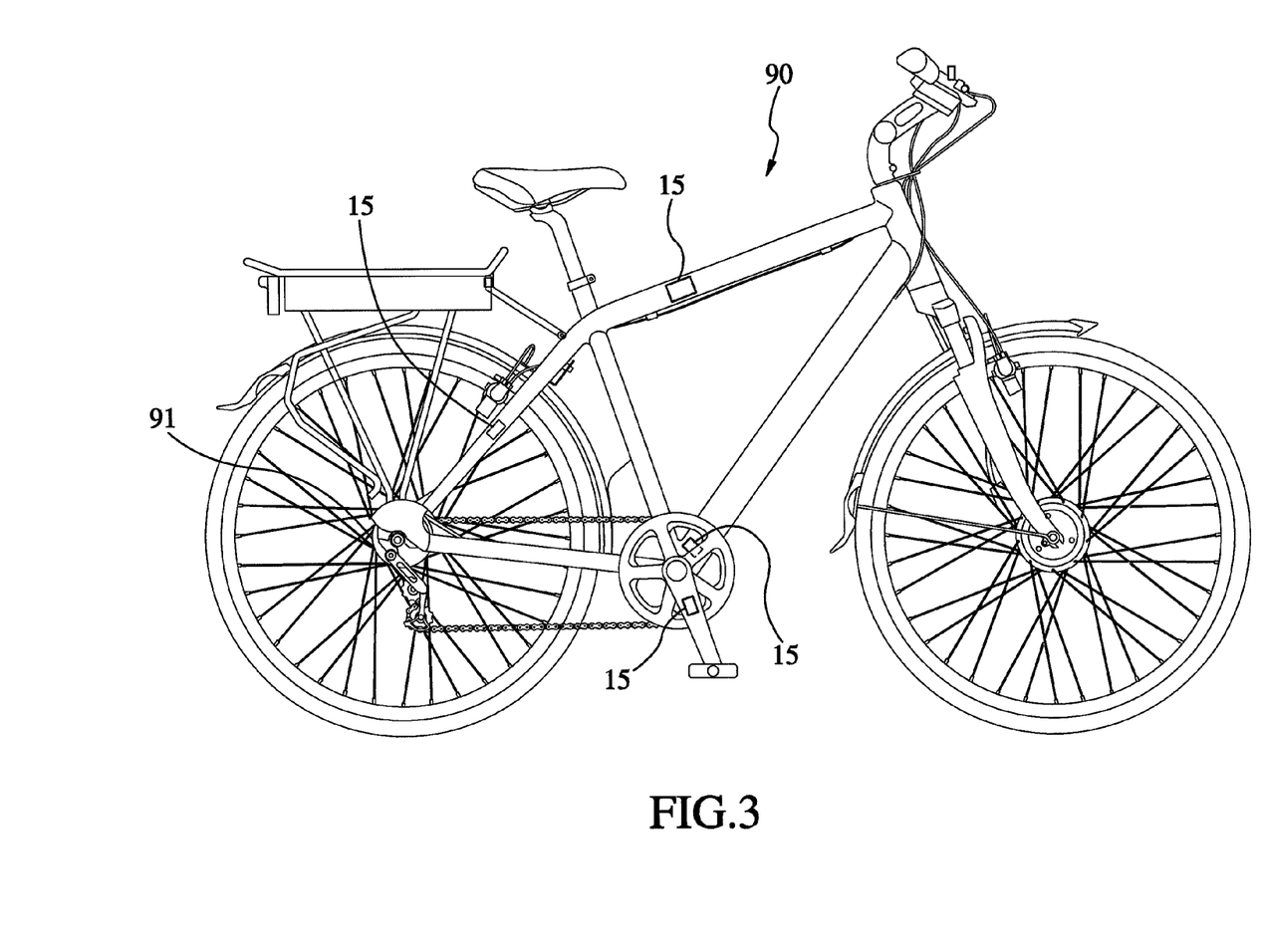
FIG. 3 is an applied view of the first preferred embodiment of the present invention.

As shown in FIG. 1 through FIG. 3, according to a first preferred embodiment of the present invention, a shift control system 10 is configured to work with a power-assisted bicycle 90. The power-assisted bicycle 90 has an assisting-power supplying system 91 and a derailleur 93. The shift control system 10 primarily comprises a microcomputer 11, a shifting driver 13, at least one sensor 15 and a display device 17.

The power-assisted bicycle 90, including its assisting-power supplying system 91 and derailleur 93, is well known in the art and thus the detailed description thereto is herein omitted.

The microcomputer 11 stores two shifting condition tables 19a and 19b therein. The assisting-power supplying system 91 is electrically connected to the microcomputer 11, so as to be controlled by the microcomputer 11 and provide at least two assisting modes that have different assisting-power output ratios.

The two shifting condition tables 19a and 19b are as Table 1 and Table 2 below and associated with a light assisting mode (30% assisting power) and a heavy assisting mode (80% assisting power), respectively.

TABLE 1

Light Assisting Mode (30% Assisting Power)

| Shifting Timing | Gear Position | | | | | | |
|---|---|---|---|---|---|---|---|
| | 1 | 2 | 3 | 4 | 5 | 6 | 7 |
| Downshifting Speed (km/hr) | | 10 | 12 | 15 | 18 | 20 | 24 |
| Upshifting Speed (km/hr) | 11 | 13 | 16 | 19 | 22 | 26 | |

TABLE 2

Heavy Assisting Mode (80% Assisting Power)

| Shifting Timing | Gear Position | | | | | | |
|---|---|---|---|---|---|---|---|
| | 1 | 2 | 3 | 4 | 5 | 6 | 7 |
| Downshifting Speed (km/hr) | | 8 | 10 | 13 | 16 | 18 | 22 |
| Upshifting Speed (km/hr) | 9 | 11 | 14 | 17 | 20 | 24 | |

The two shifting condition tables 19a and 19b (i.e. Table 1 and Table 2) show two assisting modes and speed thresholds (i.e. thresholds of wheel speeds) for upshifting and downshifting and corresponding gear positions. As can be seen in Table 1 and Table 2, the shifting timing is determined by the wheel speed. In addition, for the assisting mode providing the greater power, namely the heavy assisting mode shown in Table 2, the speed thresholds for upshifting and downshifting at one gear position are both lower than those for the assisting mode providing the smaller power at the same gear position. For example, the speed thresholds for upshifting and downshifting in the heavy assisting mode at the second gear position are 11 and 8 km/hr, respectively. For the assisting mode providing the smaller power, as the light assisting mode shown in Table 1, the speed thresholds for upshifting and downshifting at one gear position are both greater than those for the assisting mode providing the greater power at the same gear position. For example, the speed thresholds for upshifting and downshifting in the light assisting mode at the second gear position are 13 and 10 km/hr, respectively.

The shifting driver 13 is electrically connected to the microcomputer 11 so as to be controlled by the microcomputer 11 to send a shift control signal to the derailleur 93, thereby making the derailleur 93 conduct upshifting or downshifting.

The at least one sensor 15 is deposited at a predetermined location on the power-assisted bicycle 90 and is electrically connected to the microcomputer 11. It serves to sense at least one of a wheel speed, a crank speed, a pedaling force and a road gradient so as to obtain and transmit at least one sensing signal to the microcomputer 11. Then the microcomputer 11 generates at least one sensing result according to the at least one sensing signal. In FIG. 3, four such sensors 15 are mounted on a power-assisted bicycle. In the first embodiment, one of the sensors 15 is used to sense the wheel speed and obtain a sensing result.

The display device 17 is deposited on the power-assisted bicycle 90 and is electrically connected to the microcomputer 11. It serves to display the current assisting mode of the assisting-power supplying system 91. It is to be noted that while the display device 17 conveniently informs the cyclist of the current assisting mode, such a display device may be omitted in cases where, for example, a switch is used to switch between the assisting modes and indicate the current assisting mode with its current location. In other words, the display device 17 is not an essential component in the present invention.

The microcomputer 11, according to the assisting mode of the assisting-power supplying system 91, selects one said shifting condition table 19a (or 19b) for comparison with the sensing result, thereby determining whether upshifting or downshifting is to be conducted, and then controls the shifting driver 13 to send out a shift control signal to the derailleur 93 for conducting upshifting or downshifting.

The above description has illustrated the first embodiment in terms of configuration and technical means. Following this, the description will be directed to the operation of the first embodiment.

When a user rides the power-assisted bicycle 90, the microcomputer 11 uses the sensor 15 to sense the current wheel speed (or the bicycle speed), and uses the assisting-power supplying system 91 to identify the current assisting mode. Then the current bicycle speed and assisting mode are compared with the contents of the shifting condition table 19a (or 19b). If the current bicycle speed is relevant to the current gear position, no shifting is to be conducted. If irrelevant, shifting (or gear-change) is to be conducted so as to conform with the contents of the shifting condition table 19a (or 19b). For shifting, the microcomputer 11 controls the shifting driver 13 to send a shift control signal to a shifting controller (not shown) so that the shifting controller 92 accordingly controls the derailleur 93 to conduct shifting.

Thereby, according to the first embodiment, for determining whether to conduct gear-change (or shifting), in addition to the bicycle speed (i.e. the wheel speed), the assisting mode is also referred, so that the shifting can be conducted more smoothly, thereby ensuring a more comfortable riding experience.

According to a second preferred embodiment of the present invention, a shift control system for a power-assisted bicycle is similar to its counterpart described in the first preferred embodiment but features a speed-gap logic.

The two shifting condition table 19a and 19b for the second embodiment are Table 3 and Table 4 below.

TABLE 3

Light Assisting Mode (30% Assisting Power)

| Shifting Timing | Gear Position | | | | | | |
|---|---|---|---|---|---|---|---|
| | 1 | 2 | 3 | 4 | 5 | 6 | 7 |
| Downshifting Speed (km/hr) | | 10 | 12 | 15 | 18 | 20 | 24 |
| Upshifting Speed (km/hr) | 11 | 13 | 16 | 19 | 22 | 26 | |

TABLE 4

Heavy Assisting Mode (80% Assisting Power)

| Shifting Timing | Gear Position | | | | | | |
|---|---|---|---|---|---|---|---|
| | 1 | 2 | 3 | 4 | 5 | 6 | 7 |
| Downshifting Speed (km/hr) | | 10-2 | 12-2 | 15-2 | 18-2 | 20-2 | 24-2 |
| Upshifting Speed (km/hr) | 11-1.5 | 13-1.5 | 16-1.5 | 19-1.5 | 22-1.5 | 26-1.5 | |

The shifting conditions contained in the two shifting condition tables 19a and 19b (i.e. Table 3 and Table 4) correspond to wheel speeds (i.e. upshifting speeds or downshifting speeds). Each gear position in the shifting condition table 19a (or 19b) corresponds to one or both of a downshifting speed and an upshifting speed. The speed-gap logic is configured to make that the heavier the assisting mode is, the larger the gaps between the downshifting speeds and the upshifting speeds are. The microcomputer 11 determines whether upshifting or downshifting is to be conducted according to the speed-gap logic.

The operation and achieved effects of the second embodiment are similar to those of the first embodiment and are not described in any length herein.

According to a third preferred embodiment of the present invention, a shift control system for a power-assisted bicycle is similar to its counterpart described in the first preferred embodiment and also described with reference to FIG. 1, but features a gear-simplifying logic.

The gear-simplifying logic serves to simplify the gear positions into fewer gear positions. It is stored in the microcomputer 11. After determining whether upshifting or downshifting is to be conducted, the microcomputer 11 uses an additional predetermined condition to determine whether shifting is to be conducted according to the gear-simplifying logic. In the present embodiment, the predetermined condition refers to the current assisting mode. When the current assisting mode is a heavier one, it is confirmed to conduct shifting according to the gear-simplifying logic. Moreover, in the third embodiment, the gear-simplifying logic simplifies the number of gear positions by omitting the even-number gear positions.

The two shifting condition tables 19a and 19b for the present embodiment are Table 5 and Table 6 below.

TABLE 5

Light Assisting Mode (30% Assisting Power)

| Shifting Timing | Gear Position | | | | | | |
|---|---|---|---|---|---|---|---|
| | 1 | 2 | 3 | 4 | 5 | 6 | 7 |
| Downshifting Speed (Km/Hr) | | 10 | 12 | 15 | 18 | 20 | 24 |
| Upshifting Speed (Km/Hr) | 11 | 13 | 16 | 19 | 22 | 26 | |

TABLE 6

Heavy Assisting Mode (80% Assisting Power)

| Shifting Timing | Gear Position | | | |
|---|---|---|---|---|
| | 1 | 3 | 5 | 7 |
| Downshifting Speed (km/hr) | | 10 | 16 | 22 |
| Upshifting Speed (km/hr) | 11 | 17 | 23 | |

Between the two shifting condition tables 19a and 19b, for the light assisting mode, as shown in Table 5, 7 gear positions are implemented, and for the heavy assisting mode, as shown in Table 6, the second, fourth and sixth gear positions are not used, and only the four gear positions numbered 1, 3, 5 and 7 are used.

The operation and achieved effects of the third embodiment are similar to those of the first embodiment and are not described in any length herein.

According to a fourth preferred embodiment of the present invention, a shift control system for a power-assisted bicycle is similar to its counterpart described in the first preferred embodiment and also described with reference to FIG. 1, but features a sensor 15 for sensing the crank speed so as to obtain a sensing result.

The sensing result obtained by sensor 15 from the crank speed is compared by the microcomputer 11 to the contents of the two shifting condition tables 19a and 19b, so that the microcomputer 11 can determine whether upshifting or downshifting is to be conducted. The crank speed maybe an actual crank speed, or may be a pseudo crank speed defined by the microprocessor using the current wheel speed and gear position. In the present embodiment, the crank speed is a pseudo crank speed.

The two shifting condition tables 19a and 19b for the fourth embodiment are Table 7 and Table 8 below.

TABLE 7

Light Assisting Mode (30% Assisting Power)

| Shifting Timing | Gear Position | | |
|---|---|---|---|
| | 1 | 2 | 3 |
| Downshifting Crank speed (rpm) | | 50 | 50 |
| Upshifting Crank speed (rpm) | 60 | 60 | 60 |

TABLE 8

Heavy Assisting Mode (80% Assisting Power)

| | Gear Position | | |
|---|---|---|---|
| Shifting Timing | 1 | 2 | 3 |
| Downshifting Crank speed (rpm) | | 40 | 40 |
| Upshifting Crank speed (rpm) | 50 | 50 | 50 |

The operation and achieved effects of the fourth embodiment are similar to those of the first embodiment and are not described in any length herein.

According to a fifth preferred embodiment of the present invention, a shift control system for a power-assisted bicycle is similar to its counterpart described in the fourth preferred embodiment and also described with reference to FIG. 1, but features a sensor 15 for sensing the crank speed so as to obtain a sensing result. The two shifting condition tables 19a and 19b for comparison are Table 9 and Table 10 below.

TABLE 9

Light Assisting Mode (30% Assisting Power)

| | Gear Position | | |
|---|---|---|---|
| Shifting Timing | 1 | 2 | 3 |
| Downshifting Pedaling Force (kgw) | | 25 | 25 |
| Upshifting Pedaling Force (kgw) | 10 | 10 | |

TABLE 10

Heavy Assisting Mode (80% Assisting Power)

| | Gear Position | | |
|---|---|---|---|
| Shifting Timing | 1 | 2 | 3 |
| Downshifting Pedaling Force (kgw) | | 28 | 28 |
| Upshifting Pedaling Force (kgw) | 12 | 12 | |

The operation and achieved effects of the fifth embodiment are similar to those of the first embodiment and are not described in any length herein.

Figure 4:
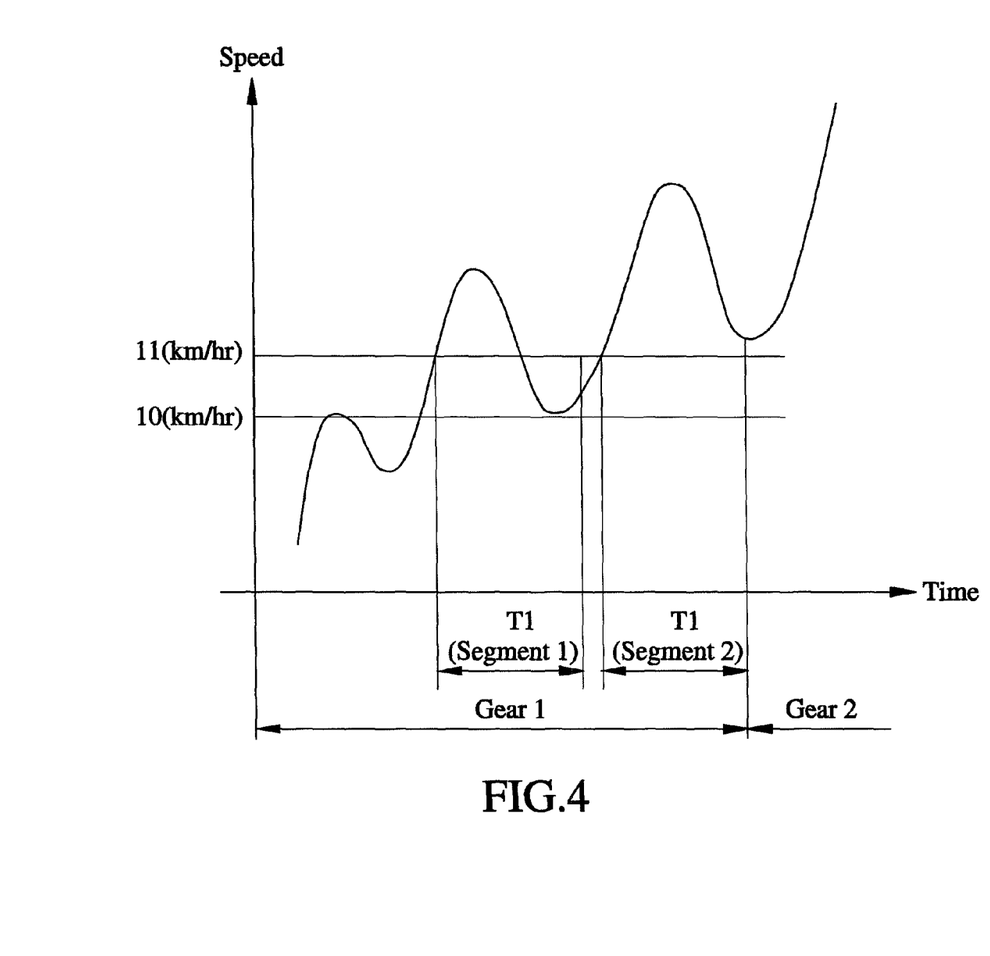
FIG. 4 according to a 6th preferred embodiment of the present invention illustrates how to use the delay time to determine shifting.

Referring to FIG. 4, according to a sixth preferred embodiment of the present invention, a shift control system for a power-assisted bicycle is similar to its counterpart described in the first preferred embodiment, and also described with reference to FIG. 1, but features using a delay time in shifting determination.

After determining whether upshifting or downshifting is to be conducted according to the shifting condition table 19a (or 19b), the microcomputer 11 waits for a delay time T1, and if the shifting condition set forth in the shifting condition table 19a (or 19b) remains satisfied after the delay time T1, the microcomputer 11 sends out the shift control signal. Therein, the heavy assisting mode has a long delay time, and the light assisting mode has a short delay time. FIG. 4 shows the wheel speed variation versus the shifting condition of the shifting condition table 19a (or 19b). In Segment 1, the wheel speed is higher than 11 km/hr so the shifting condition is satisfied. However, during the delay time T1, the wheel speed becomes lower than 11 km/hr and the shifting condition is not satisfied, so no shift control signal is outputted and thereby no shifting is conducted. In Segment 2, the wheel speed is higher than 11 km/hr so the shifting condition is satisfied, and throughout the delay time T1, the wheel speed remains higher than 11 km/hr, so the shifting condition is satisfied. Thus, the shift control signal is outputted and thereby shifting is conducted.

In the present embodiment, the delay time for the heavy assisting mode is 0.55 seconds, and for the light assisting mode is 0.8 seconds.

The operation and achieved effects of the sixth embodiment are similar to those of the first embodiment and are not described in any length herein.

Figure 5:
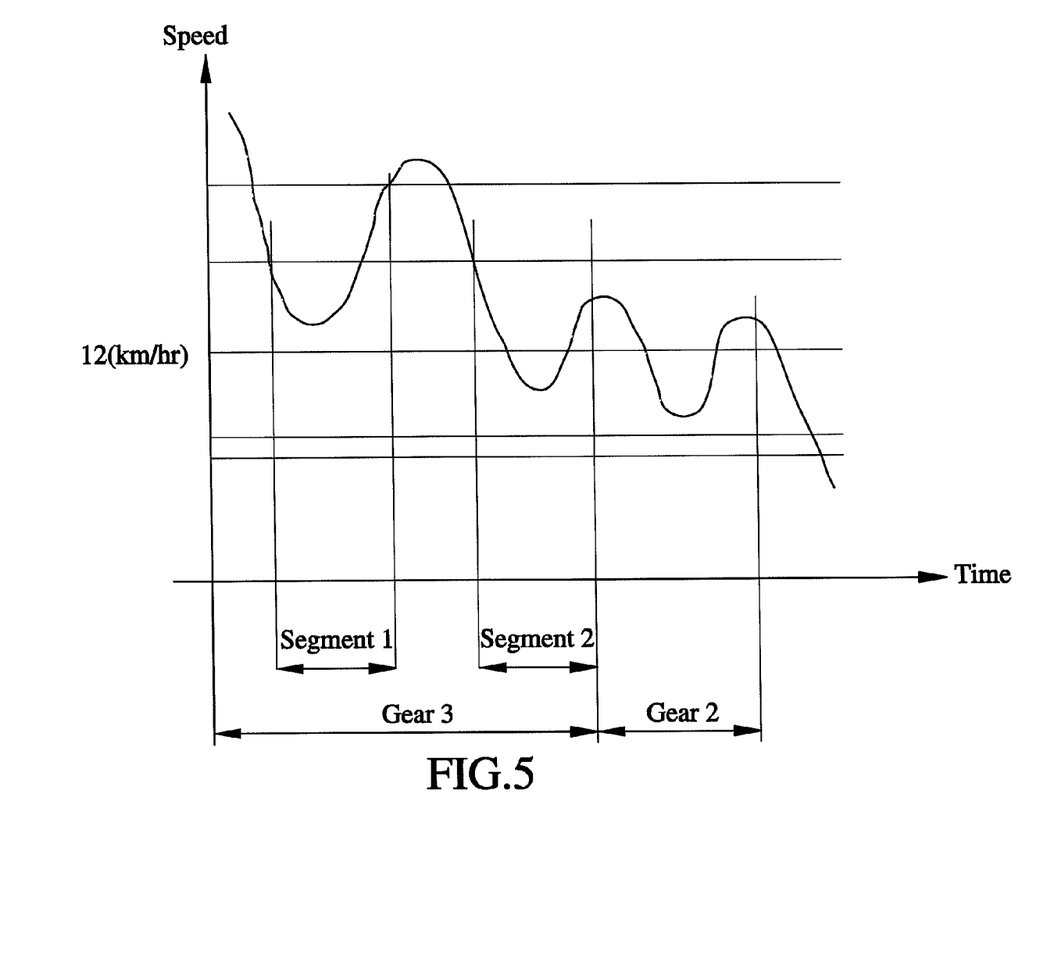
FIG. 5 according to a 7th preferred embodiment of the present invention illustrates how to use the predetermined frequency to determine shifting.

Referring to FIG. 5, according to a seventh preferred embodiment of the present invention, a shift control system for a power-assisted bicycle is similar to its counterpart described in the first preferred embodiment, and also described with reference to FIG. 1, but features using a number of times in shifting determination.

After determining whether upshifting or downshifting is to be conducted according to the shifting condition table 19a (or 19b), the microcomputer 11 compares a predetermined frequency to the contents of the shifting condition table 19a (or 19b) to determine a predetermined number of times. If more than 80% of these times satisfy the shifting condition, the shift control signal is output. In the present embodiment, the predetermined frequency refers to 40 ms/time. The predetermined number of times is subject to the assisting mode. The heavier assisting mode has a smaller number of times. For the light assisting mode, it is 20 times, and for the heavy assisting mode, it is 15 times.

FIG. 5 shows the wheel speed variation versus gear position variation. In Segment 1, since the wheel speed is higher than a downshifting threshold (12 km/hr) for Gear 3 in shifting condition table 19a (or 19b), 20 times of comparison are performed in a frequency of 40 ms/time. Segment 1 is the period where the 20 times of comparison are conducted. The wheel speed in Segment 1 later raises to be higher than 12 km/hr, and this causes the fact that less than 80% of the comparative results satisfy the shifting condition, so downshifting is not conducted. In Segment 2, since all of the comparative results are lower than the downshifting threshold, meaning that there are more than 80% of the comparative results satisfy the shifting condition, the shift control signal is outputted.

The operation and achieved effects of the seventh embodiment are similar to those of the first embodiment and are not described in any length herein.

According to an eighth preferred embodiment of the present invention, a shift control system for a power-assisted bicycle is similar to its counterpart described in the first preferred embodiment and also described with reference to FIG. 1, but features two sensors 15.

The two sensors 15 are for sensing the wheel speed and the road gradient, respectively, so as to obtain two sensing results. The two shifting condition tables 19a and 19b for comparison are Table 11 and Table 12 below, wherein the wheel speed (or bicycle speed), the road gradient and the assisting mode are referred.

TABLE 11

Light Assisting Mode (30% Assisting Power)

| Shifting Timing | Road Gradient | | | | | | | | | | | | | | |
|---|---|---|---|---|---|---|---|---|---|---|---|---|---|---|---|
| | 0% (Flat) | | | 10% (Uphill) | | | 20% (Uphill) | | | −10% (Downhill) | | | −20% (Downhill) | | |
| | Gear Position | | | | | | | | | | | | | | |
| | 1 | 2 | 3 | 1 | 2 | 3 | 1 | 2 | 3 | 1 | 2 | 3 | 1 | 2 | 3 |
| Downshifting Speed (km/hr) | | 10 | 16 | | 12 | 18 | | 14 | 20 | | 8 | 14 | | 6 | 12 |
| Upshifting Speed (km/hr) | 11 | 17 | | 13 | 19 | | 15 | 21 | | 9 | 15 | | 7 | 13 | |

TABLE 12

Heavy Assisting Mode (80% Assisting Power)

| Shifting Timing | Road Gradient | | | | | | | | | | | | | | |
|---|---|---|---|---|---|---|---|---|---|---|---|---|---|---|---|
| | 0% (Flat) | | | 10% (Uphill) | | | 20% (Uphill) | | | −10% (Downhill) | | | −20% (Downhill) | | |
| | Gear Position | | | | | | | | | | | | | | |
| | 1 | 2 | 3 | 1 | 2 | 3 | 1 | 2 | 3 | 1 | 2 | 3 | 1 | 2 | 3 |
| Downshifting Speed (km/hr) | | 8 | 14 | | 10 | 16 | | 12 | 18 | | 6 | 12 | | 4 | 10 |
| Upshifting Speed (km/hr) | 9 | 15 | | 11 | 17 | | 13 | 19 | | 7 | 13 | | 5 | 11 | |

The operation and achieved effects of the eighth embodiment are similar to those of the first embodiment and are not described in any length herein.

According to a ninth preferred embodiment of the present invention, a shift control system for a power-assisted bicycle is similar to its counterpart described in the third preferred embodiment and also described with reference to FIG. 1, but features a gear-simplifying logic working with a sensor 15.

In the present embodiment, in addition to the gear-simplifying logic as described above, a sensor 15 is used for sensing the road gradient and generating a sensing result as reference. The two shifting condition tables 19a and 19b for comparison are Table 13 and Table 14 below.

TABLE 13

| | Variable Gear Position | | | | |
|---|---|---|---|---|---|
| | Road Gradient | | | | |
| | 0% (Flat) | 10% (Uphill) | 20% (Uphill) | −10% (Downhill) | −20% (Downhill) |
| Light Assisting Mode (30% Assisting Power) | 1~7 | 1~5 | 1~3 | 1~7 | 1~7 |

TABLE 14

| | Variable Gear Position | | | | |
|---|---|---|---|---|---|
| | Road Gradient | | | | |
| | 0% (Flat) | 10% (Uphill) | 20% (Uphill) | −10% (Downhill) | −20% (Downhill) |
| Heavy Assisting Mode (80% Assisting Power) | 1, 3, 5, 7 | 1, 3, 5 | 1, 2, 3 | 1, 3, 5, 7 | 1, 3, 5, 7 |

The operation and achieved effects of the ninth embodiment are similar to those of the third embodiment and are not described in any length herein.

According to a tenth preferred embodiment of the present invention, a shift control system for a power-assisted bicycle is similar to its counterpart described in the eighth preferred embodiment and also described with reference to FIG. 1, but features two sensors 15.

The two sensors 15 are for sensing the wheel speed and the road gradient, respectively, so as to obtain two sensing results. The two shifting condition tables 19a and 19b for comparison are Table 15 and Table 16 below, wherein the crank speed may be an actual crank speed, or may be a pseudo crank speed defined by the microprocessor using the current wheel speed and gear position. In the present embodiment, the crank speed is a pseudo crank speed.

TABLE 15

Light Assisting Mode (30% Assisting Power)

| Shifting Timing | Road Gradient | | | | | | | | | | | | | | |
|---|---|---|---|---|---|---|---|---|---|---|---|---|---|---|---|
| | 0% (Flat) | | | 10% (Uphill) | | | 20% (Uphill) | | | −10% (Downhill) | | | −20% (Downhill) | | |
| | \ Gear Position | | | | | | | | | | | | | | |
| | 1 | 2 | 3 | 1 | 2 | 3 | 1 | 2 | 3 | 1 | 2 | 3 | 1 | 2 | 3 |
| Downshifting Crank speed (rpm) | | 50 | 50 | | 60 | 60 | | 70 | 70 | | 40 | 40 | | 30 | 30 |
| Upshifting Crank speed (rpm) | 60 | 60 | | 70 | 70 | | 80 | 80 | | 50 | 50 | | 40 | 40 | |

TABLE 16

Heavy Assisting Mode (80% Assisting Power)

| Shifting Timing | Road Gradient | | | | | | | | | | | | | | |
|---|---|---|---|---|---|---|---|---|---|---|---|---|---|---|---|
| | 0% (Flat) | | | 10% (Uphill) | | | 20% (Uphill) | | | −10% (Downhill) | | | −20% (Downhill) | | |
| | \ Gear Position | | | | | | | | | | | | | | |
| | 1 | 2 | 3 | 1 | 2 | 3 | 1 | 2 | 3 | 1 | 2 | 3 | 1 | 2 | 3 |
| Downshifting Crank speed (rpm) | | 40 | 40 | | 50 | 50 | | 60 | 60 | | 30 | 30 | | 20 | 20 |
| Upshifting Crank speed (rpm) | 50 | 50 | | 60 | 60 | | 70 | 70 | | 40 | 40 | | 30 | 30 | |

The operation and achieved effects of the tenth embodiment are similar to those of the eighth embodiment and are not described in any length herein.

According to an 11th preferred embodiment of the present invention, a shift control system for a power-assisted bicycle is similar to its counterpart described in the eighth preferred embodiment and also described with reference to FIG. 1, but features two sensors 15.

The two sensors 15 are for sensing the pedaling force and the road gradient, respectively, so as to obtain two sensing results. The two shifting condition tables 19a and 19b for comparison are Table 17 and Table 18 below.

TABLE 17

Light Assisting Mode (30% Assisting Power)

| Shifting Timing | Road Gradient | | | | | | | | | | | | | | |
|---|---|---|---|---|---|---|---|---|---|---|---|---|---|---|---|
| | 0% (Flat) | | | 10% (Uphill) | | | 20% (Uphill) | | | −10% (Downhill) | | | −20% (Downhill) | | |
| | \ Gear Position | | | | | | | | | | | | | | |
| | 1 | 2 | 3 | 1 | 2 | 3 | 1 | 2 | 3 | 1 | 2 | 3 | 1 | 2 | 3 |
| Downshifting Pedaling Force (kwg) | | 25 | 25 | | 23 | 23 | | 21 | 21 | | 27 | 27 | | 29 | 29 |
| Upshifting Pedaling Force (kwg) | 10 | 10 | | 8 | 8 | | 6 | 6 | | 12 | 12 | | 14 | 14 | |

TABLE 18

Heavy Assisting Mode (80% Assisting Power)

| Shifting Timing | Road Gradient | | | | | | | | | | | | | | |
|---|---|---|---|---|---|---|---|---|---|---|---|---|---|---|---|
| | 0% (Flat) | | | 10% (Uphill) | | | 20% (Uphill) | | | −10% (Downhill) | | | −20% (Downhill) | | |
| | Gear Position | | | | | | | | | | | | | | |
| | 1 | 2 | 3 | 1 | 2 | 3 | 1 | 2 | 3 | 1 | 2 | 3 | 1 | 2 | 3 |
| Downshifting Pedaling Force (Kwg) | | 28 | 28 | | 26 | 26 | | 24 | 24 | | 30 | 30 | | 32 | 32 |
| Upshifting Pedaling Force (Kwg) | 12 | 12 | | 10 | 10 | | 8 | 8 | | 14 | 14 | | 16 | 16 | |

The operation and achieved effects of the 11$^{th}$ embodiment are similar to those of the eighth embodiment and are not described in any length herein.

According to a 12$^{th}$ preferred embodiment of the present invention, a shift control system for a power-assisted bicycle is similar to its counterpart described in the sixth preferred embodiment and also described with reference to FIG. 1 and FIG. 4, but features a sensor 15 in addition to using the delay time T1.

The sensor 15 senses the road gradient and generates a sensing result as reference. The two shifting condition tables 19a and 19b for comparison are Table 19 and Table 20 below.

TABLE 19

Preset Delay Time T1

| | Road Gradient | | | | |
|---|---|---|---|---|---|
| | 0% (Flat) | 10% (Uphill) | 20% (Uphill) | −10% (Downhill) | −20% (Downhill) |
| Light Assisting Mode (30% Assisting Power) | 0.8 Sec. | 1 Sec. | 1.2 Sec. | 0.6 Sec. | 0.4 Sec. |

TABLE 20

Preset Delay Time T1

| | Road Gradient | | | | |
|---|---|---|---|---|---|
| | 0% (Flat) | 10% (Uphill) | 20% (Uphill) | −10% (Downhill) | −20% (Downhill) |
| Heavy Assisting Mode (80% Assisting Power) | 0.5 Sec. | 0.7 Sec. | 0.9 Sec. | 0.4 Sec. | 0.3 Sec. |

The operation and achieved effects of the 12$^{th}$ embodiment are similar to those of the sixth embodiment and are not described in any length herein.

According to a 13$^{th}$ preferred embodiment of the present invention, a shift control system for a power-assisted bicycle is similar to its counterpart described in the seventh preferred embodiment and also described with reference to FIG. 1 and FIG. 5, but features using a sensor 15 in addition to conducting several times of comparison with a predetermined frequency.

The comparison is conducted for a predetermined times with the contents of the shifting condition table 19a (or 19b) in the predetermined frequency. After it is determined that more than 80% of the results of several times of the comparison satisfy the shifting condition, the sensor 15 senses a road gradient and generates a sensing result as a final factor for shifting determination. The two shifting condition tables 19a and 19b for comparison are Table 21 and Table 22 below.

TABLE 21

Preset Comparison Times

| | Road Gradient | | | | |
|---|---|---|---|---|---|
| | 0% (Flat) | 10% (Uphill) | 20% (Uphill) | −10% (Downhill) | −20% (Downhill) |
| Light Assisting Mode (30% Assisting Power) | 20 Times | 25 Times | 30 Times | 15 Times | 10 Times |

TABLE 22

Preset Comparison Times

| | Road Gradient | | | | |
|---|---|---|---|---|---|
| | 0% (Flat) | 10% (Uphill) | 20% (Uphill) | −10% (Downhill) | −20% (Downhill) |
| Heavy Assisting Mode (80% Assisting Power) | 15 Times | 20 Times | 25 Times | 10 Times | 5 Times |

The operation and achieved effects of the 13$^{th}$ embodiment are similar to those of the seventh embodiment and are not described in any length herein.

According to a 14$^{th}$ preferred embodiment of the present invention, a shift control system for a power-assisted bicycle is similar to its counterpart described in the first preferred embodiment and also described with reference to FIG. 1, but features using three sensors 15.

The three sensors 15 are for sensing the wheel speed, the crank speed and the road gradient, respectively, so as to obtain three sensing results. The microcomputer 11 then uses the sensing results together with the wheel speed to calculate a result value according to the Fuzzy Rules. The two shifting condition tables 19a and 19b for comparison are Table 23 and Table 24 below.

TABLE 23

Light Assisting Mode (30% Assisting Power)

| | Gear Position | | | | | | |
|---|---|---|---|---|---|---|---|
| | 1 | 2 | 3 | 4 | 5 | 6 | 7 |
| Result Value | 10000~19999 | 20000~29999 | 30000~39999 | 40000~49999 | 50000~59999 | 60000~69999 | 70000~79999 |

TABLE 24

Heavy Assisting Mode (80% Assisting Power)

| | Gear Position | | | | | | |
|---|---|---|---|---|---|---|---|
| | 1 | 2 | 3 | 4 | 5 | 6 | 7 |
| Result Value | 10000~17999 | 18000~25999 | 26000~33999 | 34000~41999 | 42000~49999 | 50000~57999 | 58000~65999 |

The operation and achieved effects of the 14th embodiment are similar to those of the first embodiment and are not described in any length herein.

According to a 15th preferred embodiment of the present invention, a shift control system for a power-assisted bicycle is similar to its counterpart described in the first preferred embodiment and also described with reference to FIG. 1, but features having a battery.

The battery (not shown) is installed in the assisting-power supplying system 91. Since equipping an assisting-power supplying system with a battery is known in the art, this feature is not particularly illustrated by drawing.

Figure 6:
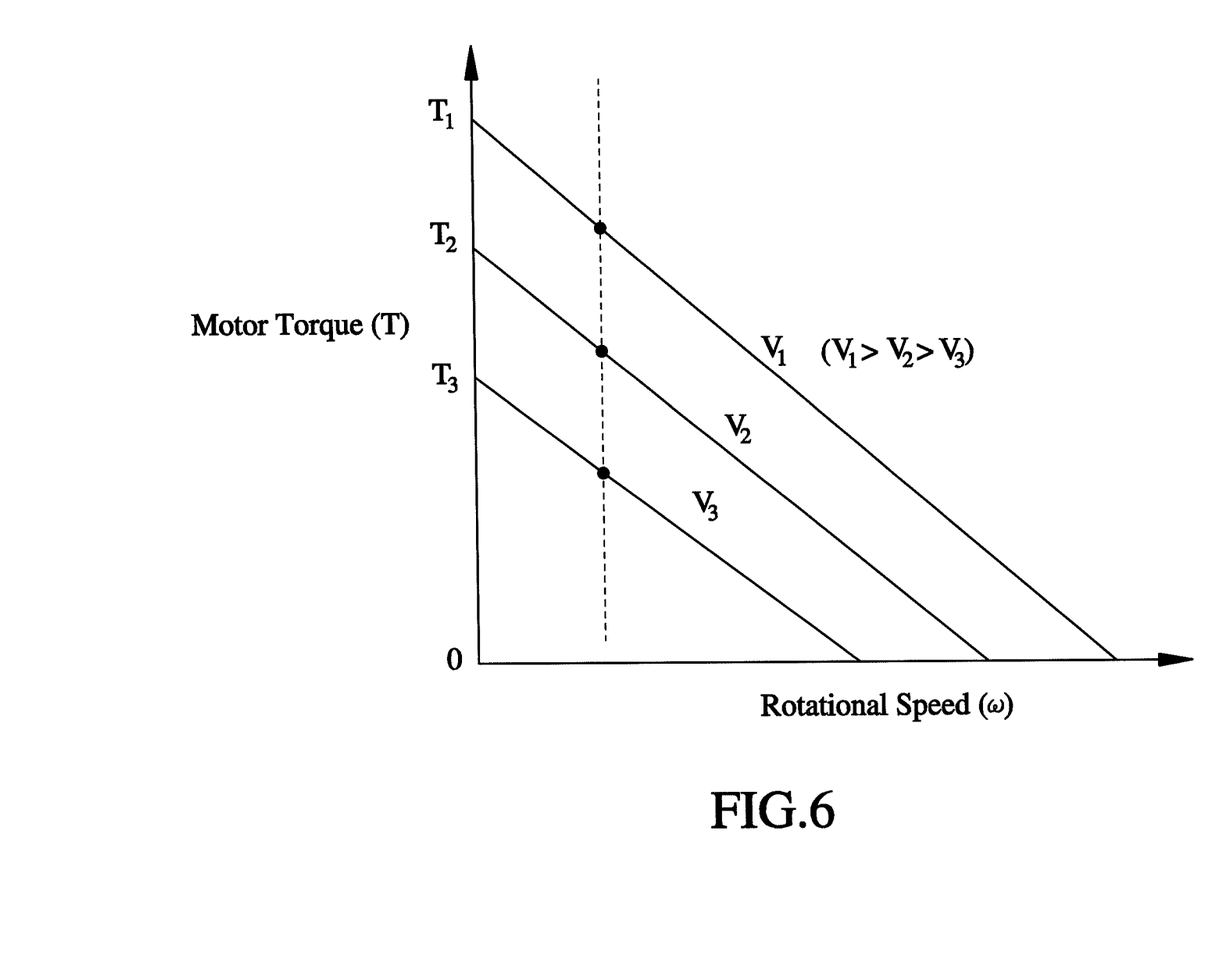
FIG. 6 according to a 15th preferred embodiment of the present invention shows the relationship between the torque as well as rotational speed of the motor and the voltage.

According to the present embodiment, under the same assisting-power output ratio, three shifting condition tables are prepared for different battery voltages. Since the voltage of a battery varies with its capacity, the current battery capacity can be derived from the battery voltage. Please refer to FIG. 6 for a graph showing the torque and rotational speed of the motor versus different voltage levels (V1, V2 and V3). As shown, under the same voltage level, the torque and rotational speed of the motor are linearly related, while under the same motor rotational speed, the lower the voltage is, the smaller the torque of the motor is. Thereby, the relationship between the output power of the assisting-power supplying system 91 and its rotational speed as well as the voltage is confirmed. This allows the microcomputer to select suitable shifting condition table according to the magnitude of voltage of the battery. In addition, magnitude of voltage of the battery is subject to the capacity of the battery.

The three shifting condition tables for comparison in the 15th embodiment are Table 25, Table 26 and Table 27 below.

TABLE 25

Battery Capacity 20%

| Shifting Timing | Gear Position | | | | | | |
|---|---|---|---|---|---|---|---|
| | 1 | 2 | 3 | 4 | 5 | 6 | 7 |
| Downshifting Speed (km/hr) | | 10 | 12 | 15 | 18 | 20 | 24 |
| Upshifting Speed (km/hr) | 11 | 13 | 16 | 19 | 22 | 26 | |

TABLE 26

Battery Capacity 50%

| Shifting Timing | Gear Position | | | | | | |
|---|---|---|---|---|---|---|---|
| | 1 | 2 | 3 | 4 | 5 | 6 | 7 |
| Downshifting Speed (km/hr) | | 9 | 11 | 14 | 17 | 19 | 23 |
| Upshifting Speed (km/hr) | 10 | 12 | 15 | 18 | 21 | 25 | |

TABLE 27

Battery Capacity 80%

| Shifting Timing | Gear Position | | | | | | |
|---|---|---|---|---|---|---|---|
| | 1 | 2 | 3 | 4 | 5 | 6 | 7 |
| Downshifting Speed (km/hr) | | 8 | 10 | 13 | 16 | 18 | 22 |
| Upshifting Speed (km/hr) | 9 | 11 | 14 | 17 | 20 | 24 | |

The operation and achieved effects of the 15th embodiment are similar to those of the first embodiment and are not described in any length herein.

Figure 7:
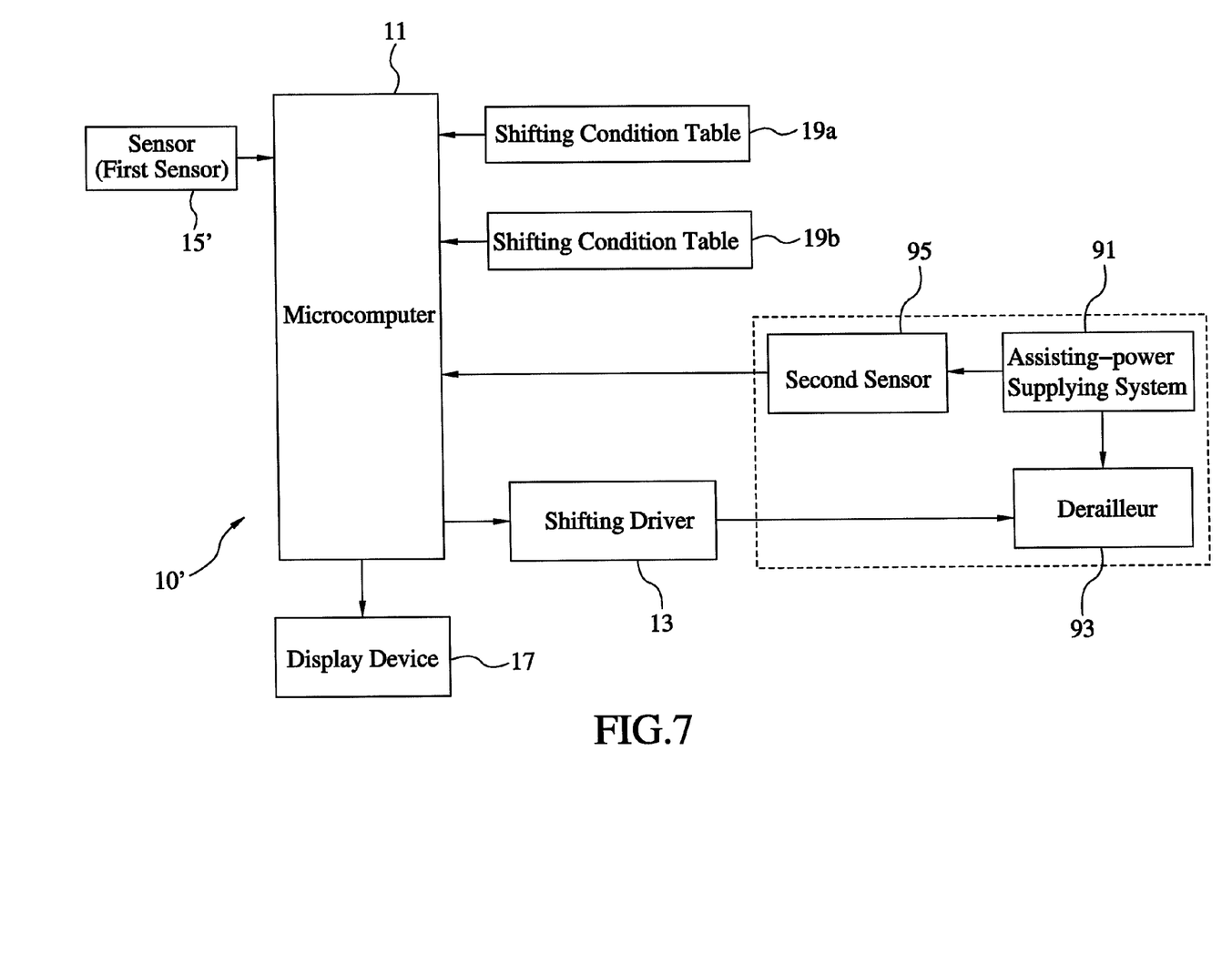
FIG. 7 is a structural block diagram of a $16^{th}$ preferred embodiment of the present invention.

Referring to FIG. 7, according to a 16th preferred embodiment of the present invention, a shift control system 10' for a power-assisted bicycle is similar to its counterpart described in the first preferred embodiment, but features its use of sensors.

At least one sensor for sensing the wheel speed, the crank speed, the pedaling force and the road gradient is defined as the first sensor 15' in the present embodiment.

The assisting-power supplying system 91 has a second sensor 95 for sensing the assisting-power output ratio of the assisting-power supplying system 91 and sending an output-ratio signal accordingly to the microcomputer 11.

The present embodiment mainly features the second sensor 95, and in virtue of the second sensor 95, the assisting mode of the assisting-power supplying system 91 can be automatically detected, opposite to the first embodiment where the microprocessor directly controls the assisting mode of the assisting-power supplying system.

The operation and achieved effects of the 16$^{th}$ embodiment are similar to those of the first embodiment and are not described in any length herein.

From the above description, it is clear that the present invention can work with various assisting modes of a power-assisted bicycle to conduct shifting appropriately with reference to various sensing results, thereby smoothing the resultant shifting and in turn minimizing discomfort during the shifting operation. This ensures the cyclists to experience a smooth shifting operation without feeling discomforted in the process of shifting.

What is claimed is:

1. A shift control system configured to work with a power-assisted bicycle that has an assisting-power supplying system and a derailleur, the shift control system comprising:
   a microcomputer storing therein a plurality of shifting condition tables and being electrically connected to the assisting-power supplying system, so as to control the assisting-power supplying system to provide at least two assisting modes that have different assisting-power output ratios;
   a shifting driver being electrically connected to the microcomputer and controlled by the microcomputer to conduct automatic shifting; and
   at least one sensor being deposited at a predetermined location on the power-assisted bicycle and electrically connected to the microcomputer, for sensing at least one of a wheel speed, a crank speed, a pedaling force and a road gradient so as to generate at least one sensing signal that is transmitted to the microcomputer, so that the microcomputer produces at least one sensing result according to the at least one sensing signal,
   wherein the microcomputer selects one of the shifting condition tables in accordance with the current assisting mode of the assisting-power supplying system for comparing the at least one sensing result, thereby determining whether upshifting or downshifting is to be conducted, and then controls the shifting driver to send a shift control signal to the derailleur for making the derailleur conduct upshifting or downshifting.

2. A shift control system configured to work with a power-assisted bicycle that has an assisting-power supplying system and a derailleur, the shift control system comprising:
   a microcomputer storing therein a plurality of shifting condition tables;
   a shifting driver being electrically connected to the microcomputer and controlled by the microcomputer to conduct automatic shifting;
   at least one first sensor being deposited at a predetermined location on the power-assisted bicycle and electrically connected to the microcomputer, for sensing at least one of a wheel speed, a crank speed, a pedaling force and a road gradient so as to generate at least one sensing signal that is transmitted to the microcomputer, so that the microcomputer produces at least one sensing result according to the at least one sensing signal;
   a second sensor being incorporated in the assisting-power supplying system, for sensing an assisting-power output ratio of the assisting-power supplying system and sending an output-ratio signal accordingly to the microcomputer;
   the microcomputer identifying a current assisting mode of the assisting-power supplying system according to the output-ratio signal, and selecting one of the shifting condition tables accordingly for comparing the at least one sensing result, thereby determining whether upshifting or downshifting is to be conducted, and then controls the shifting driver to send a shift control signal to the derailleur for making the derailleur conduct upshifting or downshifting.

3. The shift control system of claim 1, further comprising a gear-simplifying logic, which is stored in the microcomputer and serves to simplify a number of gear positions into a smaller number of the gear positions, wherein after determining whether upshifting or downshifting is to be conducted, the microcomputer additionally uses a predetermined condition to determine whether shifting is to be conducted according to the gear-simplifying logic.

4. The shift control system of claim 3, wherein the predetermined condition referred by the microcomputer is the current assisting mode.

5. The shift control system of claim 2, further comprising a gear-simplifying logic, which is stored in the microcomputer and serves to simplify a number of gear positions into a smaller number of the gear positions, wherein after determining whether upshifting or downshifting is to be conducted, the microcomputer additionally uses a predetermined condition to determine whether shifting is to be conducted according to the gear-simplifying logic.

6. The shift control system of claim 5, wherein the predetermined condition referred by the microcomputer is the output-ratio signal.

7. The shift control system of claim 4 or 6, wherein the gear-simplifying logic simplifies the number of the gear positions into the smaller number of the gear positions by omitting the even-number gear positions.

8. The shift control system of claim 4 or 6, further comprising a display device that is deposited on the power-assisted bicycle and electrically connected to the microcomputer, for displaying the current assisting mode of the assisting-power supplying system.

9. The shift control system of claim 1 or 2, wherein after determining whether upshifting or downshifting is to be conducted according to the selected shifting condition table, the microcomputer waits for a delay time, and if a shifting condition of the shifting condition table remains satisfied after the delay time, the microcomputer sends out a shift control signal, in which the heavier the assisting mode is, the shorter the delay time is, and the lighter the assisting mode is, the longer the delay time is.

10. The shift control system of claim 1 or 2, wherein after determining whether upshifting or downshifting is to be conducted according to the selected shifting condition table, the microcomputer conducts a predetermined number of times of comparison according to the shifting condition table in a predetermined frequency, and if results of more than 80% of the times of comparison satisfy a shifting condition set forth in the shifting condition table, the microcomputer sends out the shift control signal.

11. The shift control system of claim 10, wherein the predetermined frequency is 40 ms/time, and the predetermined number of times is subject to the assisting mode, in which the heavier the assisting mode is, the smaller predetermined number of times is.

12. The shift control system of claim 1 or 2, further comprising a speed-gap logic, wherein shifting conditions contained in the shifting condition tables correspond to wheel speeds, and each gear position in the shifting condition tables corresponds to one or both of a downshifting speed and a upshifting speed, in which the speed-gap logic enlarges gaps between the downshifting speeds and the upshifting speeds as the assisting mode becomes heavier and the microcomputer determines whether upshifting or downshifting is to be conducted according to the speed-gap logic.

13. The shift control system of claim 9, wherein the microcomputer uses the Fuzzy Rules to process at least two said sensing results that the sensors correspond so as to obtain a result value, and compares the result value to the selected shifting condition table so as to determine whether upshifting or downshifting is to be conducted.

14. The shift control system of claim 1, wherein the at least one sensing signal comprises a sensing signal related to the road gradient and a sensing signal related to the wheel speed, the crank speed or the pedaling force.

15. The shift control system of claim 3 or 5, wherein the at least one sensing signal comprises at least a sensing signal related to the road gradient.

16. The shift control system of claim 9, wherein the at least one sensing signal comprises at least a sensing signal related to the road gradient.

17. The shift control system of claim 10, wherein the at least one sensing signal comprises at least a sensing signal related to the road gradient.

18. The shift control system of claim 12, wherein the at least one sensing signal comprises at least sensing signals related to the road gradient and to the wheel speed.

19. The shift control system of claim 1 or 2, wherein the assisting-power supplying system has a battery, and under the same assisting-power output ratio, the microcomputer selects one of the shifting condition tables according to a magnitude of voltage of the battery.

20. The shift control system of claim 19, wherein the magnitude of voltage is subject to a power capacity of the battery.

21. The shift control system of claim 1 or 2, wherein the crank speed is an actual crank speed or a pseudo crank speed defined by the microprocessor using the current wheel speed and a current gear position.

* * * * *